United States Patent
Huang

(10) Patent No.: US 9,448,364 B2
(45) Date of Patent: Sep. 20, 2016

(54) OPTICAL WAVEGUIDE LENS AND OPTICAL COUPLING MODULE INCORPORATING THE SAME

(71) Applicant: HON HAI PRECISION INDUSTRY CO., LTD., New Taipei (TW)

(72) Inventor: Hsin-Shun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 105 days.

(21) Appl. No.: 14/526,209

(22) Filed: Oct. 28, 2014

(65) Prior Publication Data

US 2016/0085029 A1 Mar. 24, 2016

(30) Foreign Application Priority Data

Sep. 24, 2014 (TW) .............................. 103132886 A

(51) Int. Cl.
*G02B 6/26* (2006.01)
*G02B 6/34* (2006.01)
*G02B 6/30* (2006.01)

(52) U.S. Cl.
CPC . *G02B 6/34* (2013.01); *G02B 6/30* (2013.01); *G02B 6/26* (2013.01)

(58) Field of Classification Search
CPC ............. G02B 6/34; G02B 6/26; G02B 6/30
USPC ........................... 385/1–3, 14–15, 31, 27, 37
See application file for complete search history.

(56) References Cited

U.S. PATENT DOCUMENTS

| | | | | |
|---|---|---|---|---|
| 5,128,915 A | * | 7/1992 | Yamashita | G02B 6/34 369/44.12 |
| 5,696,856 A | * | 12/1997 | Van Der Tol | G02B 6/126 385/11 |
| 6,078,704 A | * | 6/2000 | Bischel | G02F 1/011 385/10 |
| 6,594,407 B2 | * | 7/2003 | Doi | G02F 1/2255 359/245 |

OTHER PUBLICATIONS

Fresnel lens in a thin film waveguide by Ashley et al., Applied Physics letters Sep. 15, 1978 pp. 490-492.*

* cited by examiner

*Primary Examiner* — Ryan Lepisto
*Assistant Examiner* — Guy Anderson
(74) *Attorney, Agent, or Firm* — Zhigang Ma

(57) ABSTRACT

An optical waveguide lens includes a substrate, and a planar waveguide and a media grating formed on the substrate in sequence. The media grating includes a first group of gratings located adjacent to the light source and a second group of gratings away from the light source. The first group of gratings and the second group of gratings each include a plurality of strip-shaped films arranged in parallel. The first group of gratings and the planar waveguide under the first group of gratings cooperatively define a first waveguide section. The second group of gratings and the planar waveguide under the second group of gratings cooperatively define a second waveguide section. Light radiated from a light source passes through the optical waveguide lens and is successively converged by the first waveguide section and the second waveguide section. An optical coupling module incorporating the optical waveguide lens is also provided.

18 Claims, 4 Drawing Sheets

OPTICAL WAVEGUIDE LENS AND OPTICAL COUPLING MODULE INCORPORATING THE SAME

FIELD

The subject matter herein generally relates to integrated optics, and particularly to an optical waveguide lens and optical coupling module incorporating the same.

BACKGROUND

In the integrated optics field, an optical lens is usually applied to improve the optical coupling efficiency between the light source and the optical transmission device such as optical fibers.

BRIEF DESCRIPTION OF THE DRAWINGS

Implementations of the present technology will now be described, by way of example only, with reference to the attached figures.

DETAILED DESCRIPTION

Figure 1:
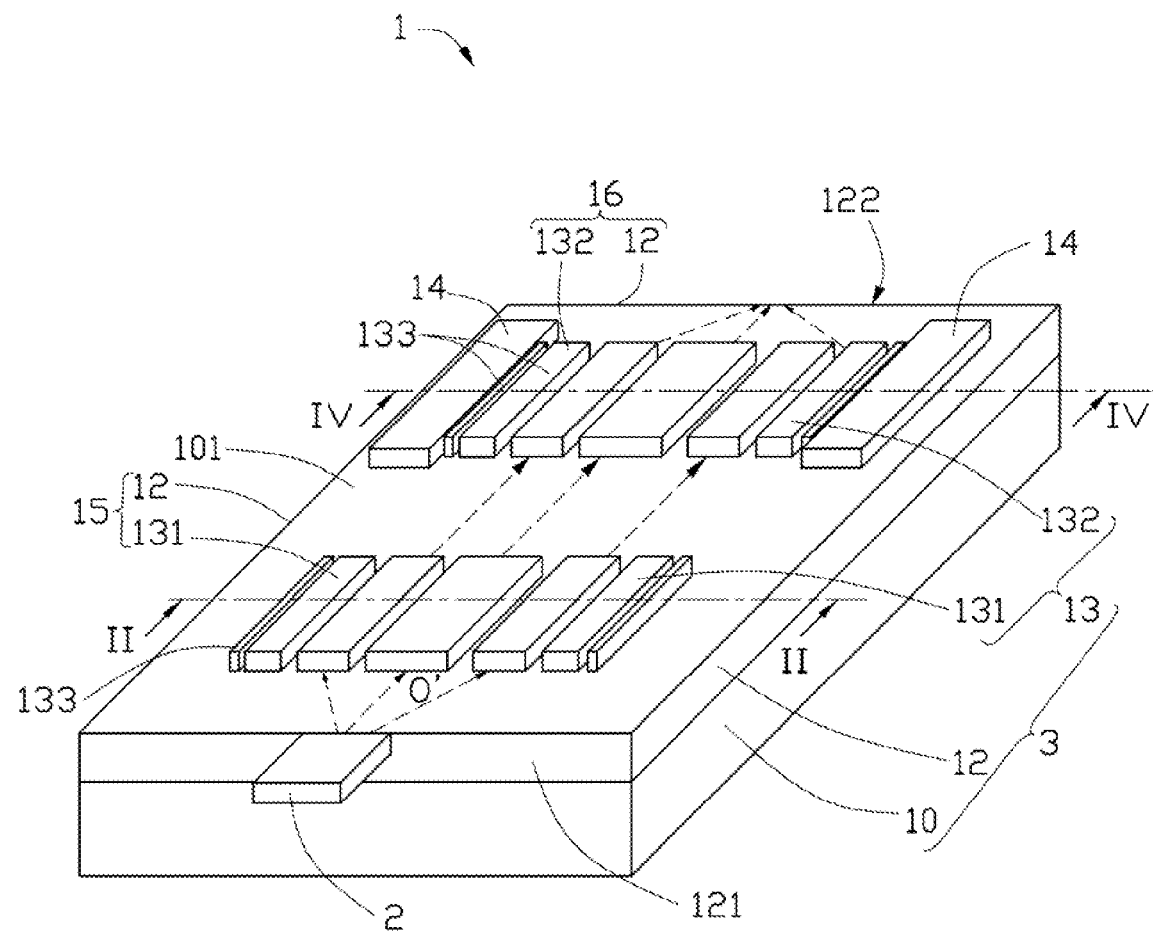
FIG. 1 is a perspective view of an optical coupling module in accordance with an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to an optical waveguide lens and an optical coupling module incorporating the optical waveguide lens.

FIG. 1 illustrates an optical coupling module 1 according to an exemplary embodiment of the present disclosure. The optical coupling module 1 includes a light source 2 and an optical waveguide lens 3 optically coupled to the light source 2. The optical waveguide lens 3 includes a substrate 10, a planar waveguide 12 and a media grating 13. The planar waveguide 12 and the media grating 13 are formed on the substrate 10 in sequence. The media grating 13 includes a first group of gratings 131 located adjacent to the light source 2, and a second group of gratings 132 located away from the light source 2. The first group of gratings 131 and the second group of gratings 132 each include a plurality of strip-shaped films 133 arranged in parallel and spaced from each other. The first group of gratings 131 and the planar waveguide 12 under the first group of gratings 131 cooperatively define a first waveguide section 15. The second group of gratings 132 and the planar waveguide 12 under the second group of gratings 132 cooperatively define a second waveguide section 16. A pair of first electrodes 14 is formed on the planar waveguide 12 and located at opposite sides of the second group of gratings 132. Light radiated from the light source 2 passes through the optical waveguide lens 3 and is successively converged by the first waveguide section 15 and the second waveguide section 16.

The substrate 10 can be of rectangular parallelepiped form. The substrate 10 can be made of lithium niobate crystal ($LiNbO_3$). The planar waveguide 12 can be prepared by diffusing titanium (Ti) into the substrate 10. The media grating 13 is deposited at a top surface 101 of the planar waveguide 12 by sputtering or evaporation. In the present embodiment, a refractive index of the substrate 10 is in a range from 2 to 2.3, a refractive index of the planar waveguide 12 is slightly larger than the refractive index of the substrate 10, and the strip-shaped films 133 are made of materials having a refractive index larger than 2.4. Preferably, a refractive index of the substrate 10 is 2.3, a refractive index of the planar waveguide 12 is 2.35, and the strip-shaped films 133 are made of materials selected from chromium or selenium having a refractive index larger than 2.4. In other words, the refractive index of the planar waveguide 12 is larger than the refractive index of the substrate 10, and the refractive index of the media grating 13 is larger than the refractive index of the planar waveguide 12.

A method for fabricating the optical waveguide lens described below is by example only and the order of performance can change according to the present disclosure. Firstly, a titanium film having a thickness of 700-900 nanometers is deposited on the entire top face of the substrate by sputtering or evaporation method. Secondly, the substrate covered by the titanium film is heated in an oven at a temperature in a range from 1000 degrees to 1200 degrees for three hours to diffuse titanium atoms into the substrate, whereby a planar waveguide is prepared. Preferably, the substrate covered by the titanium film is heated in an oven at a temperature of 1050 degrees for three hours to diffuse titanium atoms into the substrate. Finally, a media grating including a plurality of strip-shaped films is deposited on the top face of the planar waveguide by sputtering or evaporation.

The planar waveguide 12 can be of rectangular parallelepiped form. The planar waveguide 12 has a front face 121 and a back face 122 at opposite ends thereof. The light source 2 is attached to the front face 121 of the planar waveguide 12. Light radiated from the light source 2 enters the planar waveguide 12 through the front face 121, successively passes through the first waveguide section 15 and the second waveguide section 16, and exits the planar waveguide 12 through the back face 122. The light source 2 has an optical axis O' extending in a direction parallel to a lengthwise direction (i.e., a front-rear direction as viewed from FIG. 1) of the planar waveguide 12. In the present embodiment, the light source 2 is a distributed feedback laser diode (DFB) and attached to the front face 121 by welding. Alternatively, the light source 2 can be a light emitting diode (LED).

According to the theory of integrated optics, effective indexes of parts of the planar waveguide 12 loaded with the media gratings 13 increase. As such, by properly constructing the media grating 13, the media grating 13 and the planar waveguide 12 can constitute and function as a diffractive waveguide lens to converge light radiated from the light source 2. In the present embodiment, the first waveguide section 15 and the second waveguide section 16 each function as a diffractive waveguide lens to converge the light radiated from the light source 2. In detail, the light radiated from the light source 2 is first collimated by the first waveguide section 15 and then focused by the second waveguide section 16.

The plurality of strip-shaped films 133 of the first group of gratings 131 are symmetrically arranged with respect to the optical axis O' of the light source 2. The plurality of strip-shaped films 133 of the second group of gratings 132 are symmetrically arranged with respect to the optical axis O' of the light source 2. In the present embodiment, the first group of gratings 131 and the second group of gratings 132 each include seven strip-shaped films 133, and the seven strip-shaped films 133 in the first group of gratings 131 are respectively aligned with the seven strip-shaped films 133 in the second group of gratings 132. The first group of gratings 131 is spaced from the second group of gratings 132 by a short distance.

Figure 2:
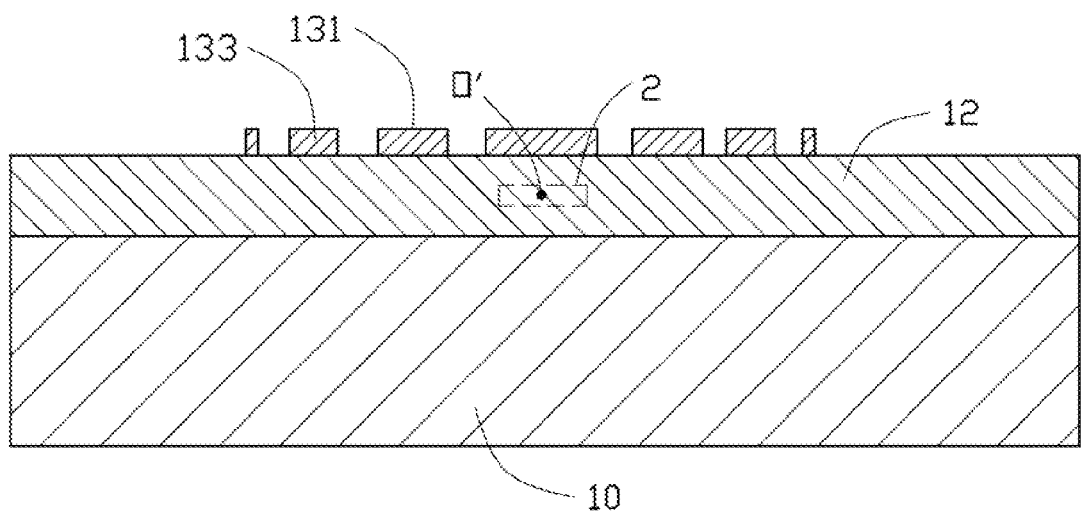
FIG. 2 is a cross-sectional view of the optical coupling module of FIG. 1, taken along a line II-II thereof.

FIG. 2 illustrates an arrangement of the plurality of strip-shaped films 133 in the first group of gratings 131. Since the first group of gratings 131 and the second group of gratings 132 have the same configuration, descriptions will be only made to the configuration of the first group of gratings 131 with reference to FIG. 2 for clarity. Widths of the plurality of strip-shaped films 133 of the first group of gratings 131 decrease along a widthwise direction (i.e., a left-right direction as viewed from FIG. 2) of the planar waveguide 12 from the optical axis O' (indicated as dot in FIG. 2) of the light source 2 (indicated as an open rectangle in dashed line in FIG. 2) toward opposite sides of the planar waveguide 12. A distance between two adjacent strip-shaped films 133 of the first group of gratings 131 decreases along the widthwise direction of the planar waveguide 12 from the optical axis O' of the light source 2 toward opposite sides of the planar waveguide 12.

Figure 4:
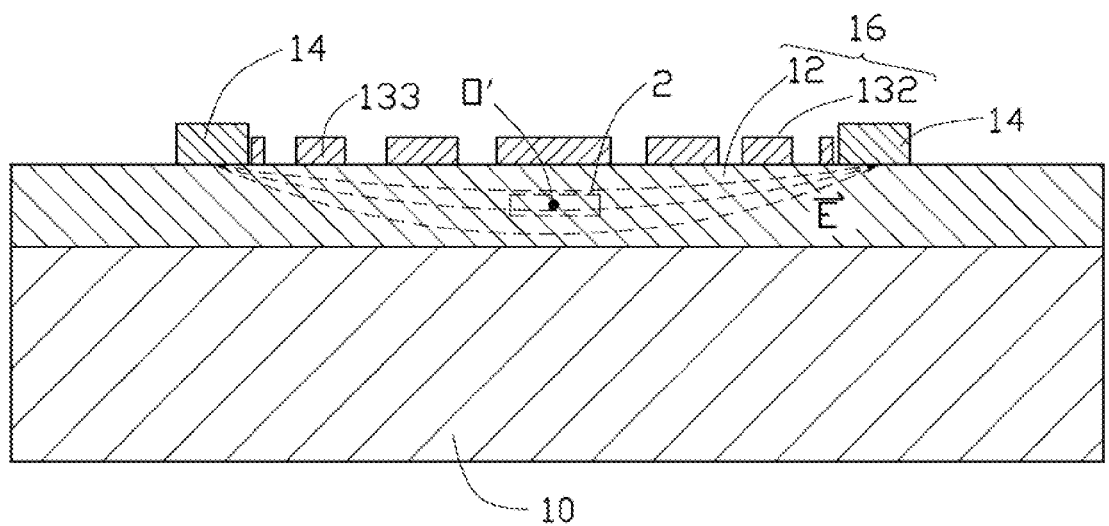
FIG. 4 is a cross-sectional view of the optical coupling module of FIG. 1, taken along a line IV-IV thereof.

FIG. 4 illustrates an electric field $\overline{E}$ (indicated as three dashed curve lines) is applied between the pair of first electrodes 14 located at opposite sides of the second group of gratings 132. The pair of first electrodes 14 is symmetrically arranged with respect to the optical axis O' (indicated as dot in FIG. 4) of the light source 2 (indicated as an open rectangle in dashed line in FIG. 4). The pair of first electrodes 14 is configured to modulate an effective refractive index of the planar waveguide 12. In detail, when the electric field $\overline{E}$ is applied between the pair of first electrodes 14, effective indexes of parts of the planar waveguide 12 loaded with the media gratings 132 increase, and an effective focal length of the second waveguide section 16 can be changed accordingly. Alternatively, the pair of first electrodes 14 can be located at opposite sides of the first group of gratings 131 to modulate an effective focal length of the first waveguide section 15.

Figure 3:
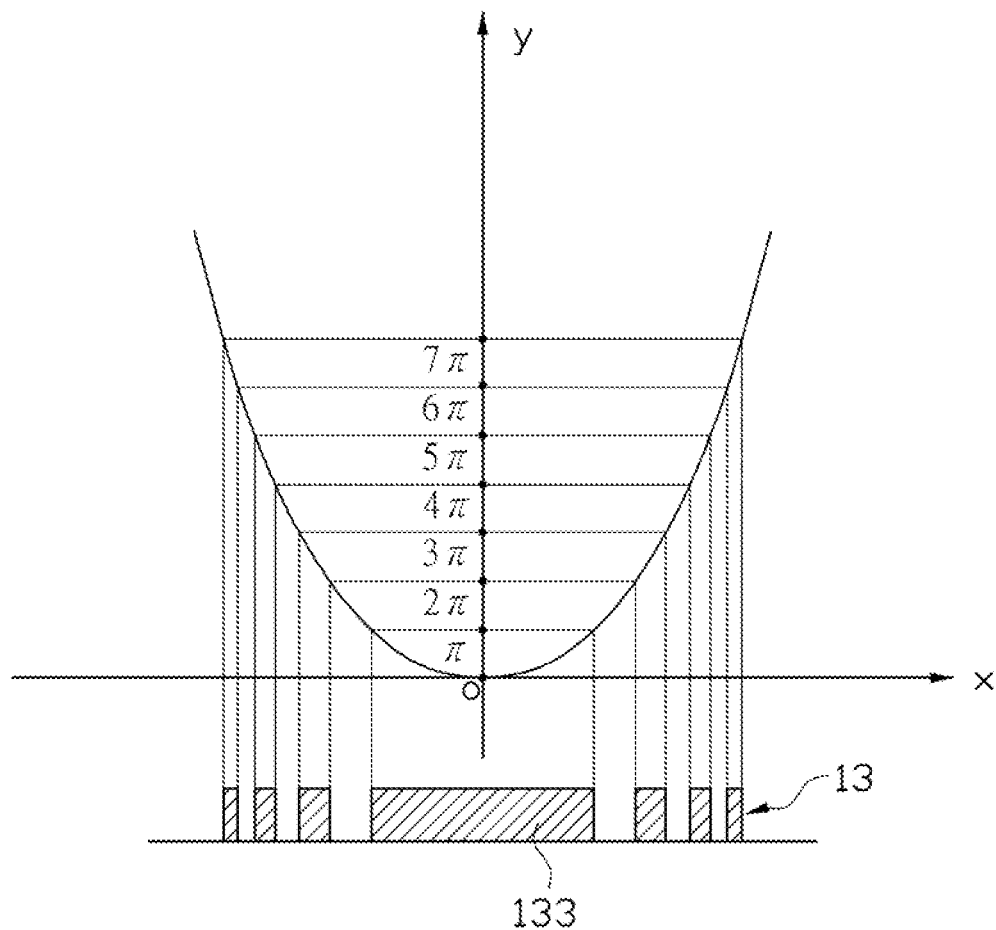
FIG. 3 is a diagram showing a phase distribution of a media grating of the optical waveguide lens of the optical coupling module of FIG. 1.

Referring to FIG. 1 and FIG. 3 together, FIG. 3 is a diagram showing a phase distribution of the media grating 13 when the media grating 13 is incident by light radiated from the light source 2 as shown in FIG. 1, wherein a coordinate system "oxy" is established, the origin "o" denotes an intersecting point of the optical axis O' of the light source 2 and the widthwise direction of a planar waveguide 12 of the optical waveguide lens 3 as shown in FIG. 1, "x" axis denotes the widthwise direction of the planar waveguide 12 as shown in FIG. 1, and "y" axis denotes a phase difference with respect to incident light incident on the media grating 13 in a direction inclined from the normal direction. The normal direction coincides with the optical axis O' of the light source 2.

According to wave theory of planar waveguides, $y=a(1-e^{kx^2})$, wherein x>0, a, e, and k are constants. In this embodiment, boundaries of the strip-shaped films 133 are set to conform to conditions of formulae: $y_n=a(1-e^{kx_s^2})$ and $y_n=n\pi$, wherein $x_s$ is the nth boundary of the strip-shaped films 133 along the "x" axis, and $y_n$ is the corresponding phase difference. That is, $$x_n = \pm \sqrt{\frac{\ln\left(1 - \frac{n\pi}{a}\right)}{k}}.$$

The boundaries of the strip-shaped films 133 located at right side of the optical axis O' of the light source 2 (see FIG. 1) can be characterized by the calculated values where $x_n>0$, and boundaries of the strip-shaped films 133 located at left side of the optical axis O' of the light source 2 (see FIG. 1) can be characterized by the calculated values where $x_n<0$.

In the present embodiment, the planar waveguide 12 are integrally formed with the substrate 10, and the media grating 13 is deposited on the planar waveguide 12, whereby a compact optical waveguide lens 3 is obtained. Further, an effective focal length of the second waveguide section 16 can be modulated by applying an electric field between the pair of first electrodes 14, whereby the optical coupling efficiency between the light source and the optical transmission device such as optical fibers can be improved.

The embodiments shown and described above are only examples. Many details are often found in the art such as the other features of a planar waveguide. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An optical waveguide lens configured for converging light emitted from a light source, comprising:
   a substrate;

a planar waveguide and a media grating formed on the substrate in sequence;

the media grating comprising a first group of gratings located adjacent to the light source and a second group of gratings away from the light source, the first group of gratings and the second group of gratings each comprising a plurality of strip-shaped films arranged in parallel and spaced from each other; and the first group of gratings and the planar waveguide under the first group of gratings cooperatively defining a first waveguide section, the second group of gratings and the planar waveguide under the second group of gratings cooperatively defining a second waveguide section;

wherein light radiated from the light source passes through the optical waveguide lens and is successively converged by the first waveguide section and the second waveguide section;

wherein a coordinate system "oxy" is established, the origin "o" denotes an intersecting point of the optical axis of the light source and a widthwise direction of the planar waveguide, "x" axis denotes the widthwise direction of the planar waveguide, "y" axis denotes a phase difference with respect to incident light incident on the media grating in a direction inclined from the normal direction, and boundary of each strip-shaped film is set to conform following conditions:

$$x_n = \pm \sqrt{\frac{\ln\left(1 - \frac{n\pi}{a}\right)}{k}},$$

and wherein $x_n$ is the nth boundary of the strip-shaped films along the "x" axis, and a and k are constants.

2. The optical waveguide lens of claim 1, wherein the diverging light emitted from the light source is first collimated by the first waveguide section and then focused by the second waveguide section.

3. The optical waveguide lens of claim 2, wherein the planar waveguide comprises a front face and a back face at opposite ends thereof, light emitted from the light source enters the planar waveguide through the front face, successively passes through the first waveguide section and the second waveguide section, and exits the planar waveguide through the back face.

4. The optical waveguide lens of claim 2, wherein the planar waveguide is of rectangular parallelepiped form, the light source is arranged in a manner that an optical axis of the light source extends in a direction parallel to a lengthwise direction of the planar waveguide, the plurality of strip-shaped films of the first group of gratings and the second group of gratings are symmetrically arranged with respect to the optical axis of the light source.

5. The optical waveguide lens of claim 4, wherein widths of the plurality of strip-shaped films of the first group of gratings and the second group of gratings decrease along a widthwise direction of the planar waveguide from the optical axis of the light source toward opposite sides of the planar waveguide.

6. The optical waveguide lens of claim 5, wherein a distance between two adjacent strip-shaped films of the first group of gratings decreases along the widthwise direction of the planar waveguide from the optical axis of the light source toward opposite sides of the planar waveguide, and a distance between two adjacent strip-shaped films of the second group of gratings decreases along the widthwise direction of the planar waveguide from the optical axis of the light source toward opposite sides of the planar waveguide.

7. The optical waveguide lens of claim 1, wherein the first group of gratings and the second group of gratings each comprises seven strip-shaped films, and the seven strip-shaped films in the first group of gratings are respectively aligned with the seven strip-shaped films in the second group of gratings.

8. The optical waveguide lens of claim 4, further comprising a pair of first electrodes formed on the planar waveguide, wherein the pair of first electrodes are symmetrically arranged with respect to the optical axis of the light source and located at opposite sides of the second group of gratings, and an effective focal length of the second waveguide section can be modulated by applying an electric field between the pair of first electrodes.

9. The optical waveguide lens of claim 4, wherein the first group of gratings is spaced from the second group of gratings.

10. The optical waveguide lens of claim 2, wherein the planar waveguide is made of lithium niobate diffused with titanium.

11. The optical waveguide lens of claim 2, wherein a refractive index of the media grating is larger than the refractive index of the planar waveguide.

12. An optical coupling module, comprising:
a light source; and
an optical waveguide lens optically coupled to the light source;
the optical waveguide lens comprising:
a substrate; and
a planar waveguide and a media grating formed on the substrate in sequence;
the media grating comprising a first group of gratings located adjacent to the light source and a second group of gratings away from the light source, the first group of gratings and the second group of gratings each comprising a plurality of strip-shaped films arranged in parallel and spaced from each other;
wherein the first group of gratings and the planar waveguide under the first group of gratings cooperatively define a first waveguide section, and the second group of gratings and the planar waveguide under the second group of gratings cooperatively define a second waveguide section; and
wherein light radiated from the light source passes through the optical waveguide lens and is successively converged by the first waveguide section and the second waveguide section;
wherein a coordinate system "oxy" is established, the origin "o" denotes an intersecting point of the optical axis of the light source and a widthwise direction of the planar waveguide, "x" axis denotes the widthwise direction of the planar waveguide, "y" axis denotes a phase difference with respect to incident light incident on the media grating in a direction inclined from the normal direction, and boundary of each strip-shaped film is set to conform following conditions:

$$x_n = \pm \sqrt{\frac{\ln\left(1 - \frac{n\pi}{a}\right)}{k}},$$

and wherein $x_n$ is the nth boundary of the strip-shaped films along the " x " axis, and a and k are constants.

13. The optical coupling module of claim 12, wherein the diverging light emitted from the light source is first collimated by the first waveguide section and then focused by the second waveguide section.

14. The optical coupling module of claim 13, wherein the planar waveguide comprises a front face and a back face at opposite ends thereof, light emitted from the light source enters the planar waveguide through the front face, successively passes through the first waveguide section and the second waveguide section, and exits the planar waveguide through the back face.

15. The optical coupling module of claim 13, wherein the planar waveguide is of rectangular parallelepiped form, the light source is arranged in a manner such that an optical axis of the light source extends in a direction parallel to a lengthwise direction of the planar waveguide, the plurality of strip-shaped films of the first group of gratings and the second group of gratings are symmetrically arranged with respect to the optical axis of the light source.

16. The optical coupling module of claim 15, wherein widths of the plurality of strip-shaped films of the first group of gratings and the second group of gratings decrease along a widthwise direction of the planar waveguide from the optical axis of the light source toward opposite sides of the planar waveguide.

17. The optical coupling module of claim 15, wherein a distance between two adjacent strip-shaped films of the first group of gratings decreases along a widthwise direction of the planar waveguide from the optical axis of the light source toward opposite sides of the planar waveguide, and a distance between two adjacent strip-shaped films of the second group of gratings decreases along a widthwise direction of the planar waveguide from the optical axis of the light source toward opposite sides of the planar waveguide.

18. An optical waveguide lens configured to converge light emitted from a light source, the waveguide lens comprising:
   a substantially planar substrate having;
      a top surface;
      a bottom surface opposite to and substantially parallel to the top surface;
      a first side surface;
      a second side surface opposite to and substantially parallel to the first side surface;
      a front face; and
      back face opposite to and substantially parallel to the front face;
      the first side, second side, front face and back face each substantially perpendicular to the top surface and the bottom surface;
   a planar waveguide having:
      a top surface;
      a bottom surface opposite to and substantially parallel to the top surface;
      a first side surface;
      a second side surface opposite to and substantially parallel to the first side surface;
      a front face; and
      a back face opposite to and substantially parallel to the front face;
      the first side, second side, front face and back face each substantially perpendicular to the top surface and the bottom surface; and
      the planar waveguide positioned on the top surface of the planar substrate with;
      the bottom surface of the planar waveguide against the top surface of the planar substrate; and
      the front substrate surface substantially contiguous with the front waveguide surface;
   a first set of media gratings positioned on the top surface of the planar waveguide; and
   a second set of media gratings positioned on the top surface of the planar waveguide;
   wherein, the first set of media gratings and the second set of media gratings each comprise a plurality of elongated strip-shaped film elements, the elongated film elements spaced apart and arranged in parallel to the first side surface of the planar waveguide and the second side surface of the planar waveguide;
   wherein, the first set of media gratings is positioned near the front face of the planar waveguide to form a first waveguide section;
   wherein, the second set of media gratings is positioned away from the front face of the planar waveguide to form a second waveguide section; and
   wherein, light emitted from a light source positioned at the front face of the planar waveguide is converged by the first waveguide section and then the second waveguide section;
   wherein a coordinate system "oxy" is established, the origin "o" denotes an intersecting point of the optical axis of the light source and a widthwise direction of the planar waveguide, "x" axis denotes the widthwise direction of the planar waveguide, "y" axis denotes a phase difference with respect to incident light incident on the first set of media gratings and the second set of media gratings in a direction inclined from the normal direction, and boundary of each of the elongated strip-shaped film elements is set to conform following conditions:

$$x_n = \pm\sqrt{\frac{\ln\left(1 - \frac{n\pi}{a}\right)}{k}},$$

and wherein $x_n$ is the nth boundary of the strip-shaped film elements along the "x" axis, and a and k are constants.

* * * * *